Patented June 20, 1950

2,512,283

UNITED STATES PATENT OFFICE 2,512,283

PURIFICATION OF PHTHALIC ANHYDRIDE

Ralph Marotta, Malden, and Robert D. Swisher, Winchester, Mass., assignors to Monsanto Chemical Company, St. Louis, Mo., a corporation of Delaware No Drawing. Application February 21, 1948, Serial No. 10,175

7 Claims. (Cl. 202—57)

The present invention relates to an improved method of purifying crude phthalic anhydrides and particularly those which have been prepared by the vapor phase catalytic oxidation of naphthalene.

It is essential in the preparation of high quality alkyd resins, phthalic ester plasticizers and the like, that the phthalic anhydride used be substantially free from odor and colored impurities and that it be substantially stable on heating. If the phthalic anhydride used does not meet these fundamental criteria, the products prepared therefrom will generally be unsatisfactory in regard to odor or color or both and will be unacceptable commercially for many uses which require a high quality product.

The use of chemicals in the purification of crude phthalic anhydride, including in some instances the use of a single chemical, is known. However, such single chemical treatments, as carried out heretofore, have had one or more disadvantages depending upon the chemical used. In general, these disadvantages are as follows: (1) the product is not sufficiently purified and is characterized by disagreeable odor, or color or both; (2) the chemicals used are either difficult to handle in commercial application, or lower the yield of phthalic anhydride or both.

One object of the invention is to provide a simple and efficient method for purifying crude phthalic anhydride by means of a single chemical treatment without substantially reducing the yield of phthalic anhydride.

A further object of the invention is to prepare a purified phthalic anhydride which is characterized by agreeable odor, satisfactory color characteristics, heat stability and stability on storage.

A further object of the invention is to provide a simple chemical purification treatment of crude phthalic anhydride which has been prepared by the vapor phase catalytic oxidation of naphthalene, whereby a purified phthalic anhydride suitable for the manufacture of high quality chemical derivatives is readily prepared.

Still further objects and advantages of the invention will appear from the following description and the appended claims.

The objects of the invention, generally, are attained by heating a crude phthalic anhydride, preferably one that is prepared by the vapor phase catalytic oxidation of naphthalene, and a small proportion of an alkali metal nitrate at a temperature above 250° C., but not substantially in excess of the boiling point at atmospheric pressure, without substantial loss of phthalic anhydride vapor, until a distillate obtained therefrom is substantially free from odor, has a color of 0–10 on the Platinum-Cobalt (Hazen) Color Standard and is stable on heating, and then separating phthalic anhydride in purified form, preferably by distilling the phthalic anhydride at sub-atmospheric pressure.

The invention is adapted to the purification of a crude phthalic anhydride or to the purification of a semi-refined phthalic anhydride, that is a crude phthalic anhydride which has been given one or more preliminary distillations prior to purification, or to mixtures thereof. The amount of alkali metal nitrate used, the duration of the treatment and the temperature employed will, accordingly, vary depending upon the crude used and the degree to which it has been refined prior to the chemical purification step.

As examples of alkali metal nitrates which are employable in the practice of the invention may be mentioned $LiNO_3$, $NaNO_3$, $KNO_3$, $CsNO_3$ and the like, while $LiNO_3$ and $NaNO_3$ are preferred. In general, it is preferable to employ at least 0.0001 mol of such alkali metal nitrate per mol of phthalic anhydride in the crude when the treatment is carried out on a crude which has been prepared by the vapor phase catalytic oxidation of naphthalene. Smaller amounts of such nitrate may be used, however, when treating a semi-refined phthalic anhydride. Generally, from 0.0001 to 0.08 mol of alkali metal nitrate per mol of phthalic anhydride in the crude is satisfactory for the chemical purification of most crudes. However, larger amounts of alkali metal nitrate may be used, if desired, although they are not generally necessary, and the yield of phthalic anhydride may be affected if excessive amounts are employed.

In a preferred embodiment of the invention a crude phthalic anhydride, which has been prepared by the vapor phase catalytic oxidation of naphthalene, is heated together with from about 0.0001 to 0.08 mol of $LiNO_3$ or $NaNO_3$ per mol of phthalic anhydride in the crude to a temperature above 275° C., preferably at the boiling point, at atmospheric pressure under reflux for a period of from ½ to 5 hours, or until a distillate obtained therefrom is substantially free from disagreeable odor and has a color of 0–10 on the Platinum-Cobalt (Hazen) Color Standard, and then fractionally distilling the phthalic anhydride from such mixture at sub-atmospheric pressures below about 500 mm. of mercury absolute pressure.

A further understanding of the invention will be obtained from the following examples which are intended to be illustrative, but not limitative of the scope of the invention, parts and per-

Example I

To 100 parts of molten crude phthalic anhydride, which had been prepared by the vapor phase catalytic oxidation of naphthalene, was added 0.05 part of $NaNO_3$ and the mixture was agitated and then boiled (about 285° C.) at atmospheric pressure under reflux for a period of 5 hours. The phthalic anhydride thus treated was fractionally distilled at an absolute pressure of about 235 mm. of mercury.

It is preferable to collect the first fraction of about 5% separately and to combine this fraction either with unpurified crudes or with other fractions of similar nature and then purify them according to the procedure described above.

The molten phthalic anhydride, which is purified by the procedure described above, has an agreeable odor, a color of 0–10 on the Platinum-Cobalt (Hazen) Color Standard and is stable, without change of color, when heated at 250° C. for 1½ hours in a Pyrex tube. This product when solidified is stable on storage in the absence of light without substantial change in color or odor and is suitable for the manufacture of high quality alkyd resins and phthalic ester plasticizers.

The Platinum-Cobalt (Hazen) Color Standard referred to herein is described at page 71, 1939 ed., of "Physical and Chemical Examination of Paints, Varnishes, Lacquers and Colors" by Henry A. Gardner, published by The Institute of Paint and Varnish Research, Washington, D. C.

Example II

A crude phthalic anhydride, which had been prepared by the vapor phase catalytic oxidation of naphthalene, was heated together with 0.008% of $LiNO_3$, based on the phthalic anhydride in the crude, at the boiling point (about 285° C.) of phthalic anhydride under reflux at atmospheric pressure for a period of about 6 hours. The resulting mixture was then fractionally distilled at an absolute pressure of about 235 mm. of mercury.

The phthalic anhydride which was purified in the above manner has substantially the same color, odor and stability characteristics and utility as that prepared by the procedure of Example I.

Example III

To 100 parts of a crude phthalic anhydride, which had been prepared by the vapor phase catalytic oxidation of naphthalene, was added 0.1 part of $KNO_3$ and the resulting mixture was heated under reflux at a temperature of 275° C. for a period of 5 hours. This mixture was then fractionally distilled at an absolute pressure of about 300 mm. of mercury.

The phthalic anhydride which is purified according to this procedure has an agreeable odor, a color of 0–10 on the Platinum-Cobalt (Hazen) Color Standard, is stable without change of color and odor when heated for 1½ hours in a Pyrex tube at 250° C. and is stable on storage, in the absence of light without substantial change in color and odor. In addition, the product is suitable for the preparation of high quality alkyd resins and phthalic ester plasticizers.

Example IV

A semi-refined phthalic anhydride, which had been obtained by the distillation of a crude phthalic anhydride prepared by the vapor phase catalytic oxidation of naphthalene, was admixed in the molten state with about 0.5% of $NaNO_3$, based on the phthalic anhydride in the crude, and the mixture was boiled under reflux (about 285° C.) at atmospheric pressure for about one hour. The mixture was then fractionally distilled at an absolute pressure of about 300 mm. of mercury.

The purified product so obtained has substantially the same odor, color and stability characteristics and utility as that prepared in Example I.

The alkali metal nitrates as used herein may be in anhydrous form or may contain water of crystallization, or mixtures thereof may be used. It is preferable to employ a substantially anhydrous salt especially for ease of handling.

What is claimed is:

1. A method of purifying crude phthalic anhydride containing odor and color impurities, which comprises admixing said crude anhydride and a small proportion of alkali metal nitrate, heating the resulting mixture above about 250° C., without substantial loss of phthalic anhydride vapor, and then separating phthalic anhydride from said mixture in purified form.

2. A method of purifying crude phthalic anhydride prepared by the vapor phase catalytic oxidation of naphthalene, which comprises heating a mixture comprising at least 0.0001 mol of alkali metal nitrate per mol of said crude anhydride above about 250° C. but not substantially in excess of the boiling point of phthalic anhydride at atmospheric pressure, without substantial loss of phthalic anhydride vapor, and then separating phthalic anhydride from said mixture in purified form.

3. A method of purifying crude phthalic anhydride prepared by the vapor phase catalytic oxidation of naphthalene, which comprises heating a mixture comprising from about 0.0001 to 0.08 mol of alkali metal nitrate per mol of said crude anhydride above about 250° C. but not in excess of the boiling point of phthalic anhydride at atmospheric pressure, without substantial loss of phthalic anhydride vapor, for a period of at least 30 minutes and then separating purified phthalic anhydride from said mixture by distillation at sub-atmospheric pressure.

4. A method according to claim 3 wherein the alkali metal nitrate is $NaNO_3$.

5. A method according to claim 3 wherein the alkali metal nitrate is $LiNO_3$.

6. A method according to claim 3 wherein the alkali metal nitrate is $KNO_3$.

7. A method of purifying crude phthalic anhydride prepared by the vapor phase catalytic oxidation of naphthalene, which comprises distilling said crude anhydride, heating a mixture of the distilled anhydride and a small proportion of an alkali metal nitrate at a temperature substantially above 250° C. without substantial loss of phthalic anhydride vapor, and then separating phthalic anhydride from said mixture in purified form.

RALPH MAROTTA.
ROBERT D. SWISHER.

REFERENCES CITED

The following references are of record in the file of this patent:

UNITED STATES PATENTS

| Number | Name | Date |
|---|---|---|
| 2,349,518 | Porter | May 23, 1944 |